United States Patent [19]
Ostrovsky

[11] Patent Number: 6,128,406
[45] Date of Patent: Oct. 3, 2000

[54] METHOD OF COMPRESSING AND DECOMPRESSING GRAPHICS IMAGES

[75] Inventor: Alex Ostrovsky, San Francisco, Calif.

[73] Assignee: Fujitsu Microelectronics, Inc., San Jose, Calif.

[21] Appl. No.: 08/846,549

[22] Filed: Apr. 30, 1997

[51] Int. Cl.[7] .............................. G06K 9/00; G06K 9/36
[52] U.S. Cl. ......................... 382/166; 382/162; 382/232
[58] Field of Search ................................ 382/166, 167, 382/162, 232, 233, 239, 244–247, 253; 348/403, 417, 420, 422; 345/185–203, 155

[56] References Cited

U.S. PATENT DOCUMENTS

| | | | |
|---|---|---|---|
| 5,253,078 | 10/1993 | Balkanski et al. | 358/426 |
| 5,408,542 | 4/1995 | Callahan | 382/232 |
| 5,424,755 | 6/1995 | Lucas et al. | 345/155 |
| 5,585,944 | 12/1996 | Rodriquez | 358/500 |

*Primary Examiner*—Jose L. Couso
*Assistant Examiner*—Duy M. Dang
*Attorney, Agent, or Firm*—Christie, Parker & Hale, LLP

[57] ABSTRACT

A method of compressing a block of graphics image data into a compressed block operates on uncompressed bitmap image data to generate a compressed representation of the image. It also operates on compressed bitmap image data to generate the original, uncompressed representation. To compress an image, all 8 pixel by 8 pixel blocks of the image are individually processed in sequence. For each block, all distinct colors present in the block are identified and assigned an ordinal number. A data structure for the block is generated to store the number of distinct colors present in the block, a compression image quality mask value, the actual RGBA quadruplet for each color present in the block, and for each distinct color, sets of group and line binary flags indicating the presence of a particular color at a particular pixel within the block. The data structure for the block is then stored in memory or in a computer file and the next block of the image is processed. This process is repeated for all blocks of the bitmap image. To decompress the image, the RGBA quadruplets of all pixels within each block are reconstructed from the data structure for the block. This reconstruction is repeated for all blocks in the image. Both lossless and lossy compression methods are provided.

31 Claims, 11 Drawing Sheets

|   | 0 | 1 | 2 | 3 | 4 | 5 | 6 | 7 |
|---|---|---|---|---|---|---|---|---|
| 0 | 3 | 1 | 3 | 3 | 4 | 4 | 4 | 4 |
| 1 | 4 | 3 | 4 | 3 | 4 | 3 | 4 | 4 |
| 2 | 3 | 3 | 3 | 3 | 3 | 3 | 3 | 3 |
| 3 | 2 | 5 | 5 | 5 | 5 | 4 | 2 | 5 |
| 4 | 2 | 2 | 2 | 2 | 2 | 4 | 4 | 4 |
| 5 | 1 | 2 | 1 | 1 | 1 | 1 | 1 | 1 |
| 6 | 2 | 2 | 1 | 1 | 1 | 1 | 3 | 3 |
| 7 | 6 | 6 | 6 | 6 | 6 | 6 | 6 | 3 |

FIG. 2

| 1 | R1 | G1 | B1 | A1 |
|---|---|---|---|---|
| 2 | R3 | G3 | B3 | A3 |
| 3 | R6 | G6 | B6 | A6 |
| 4 | R2 | G2 | B2 | A2 |
| 5 | R4 | G4 | B4 | A4 |
| 6 | R5 | G5 | B5 | A5 |

FIG. 3

{ N = 6, MASK VALUE,
R1, G1, B1, A1, GROUP 1, LINE 10, LINE 15, LINE 16,  // COLOR 1
R2, G2, B2, A2, GROUP 2, LINE 20, LINE 21, LINE 23, LINE 24,  // COLOR 4
R3, G3, B3, A3, GROUP 3, LINE 33, LINE 34, LINE 35, LINE 36  // COLOR 2
R4, G4, B4, A4, GROUP 4, LINE 43,  // COLOR 5
R5, G5, B5, A5, GROUP 5, LINE 57,  // COLOR 6
R6, G6, B6, A6}  // COLOR 3

FIG. 4

| 00000110 | MASK VAL | R1G1     | B1A1     |
|----------|----------|----------|----------|
| 10000110 | 01000000 | 10111111 | 00111100 |
| R2G2     | B2A2     | 11011000 | 00001111 |
| 10101011 | 00000100 | 00000111 | R3G3     |
| B3A3     | 00011110 | 10000010 | 11111000 |
| 01000000 | 11000000 | R4G4     | B4A4     |
| 00010000 | 01111001 | R5G5     | B5A5     |
| 00000001 | 11111110 | R6G6     | B6A6     |

FIG. 5

METHOD OF COMPRESSING AND DECOMPRESSING GRAPHICS IMAGES

A portion of the disclosure of this patent document contains material which is subject to copyright protection. The copyright owner has no objection to the facsimile reproduction by any one of the patent disclosure, as it appears in the Patent and Trademark office patent files or records, but otherwise reserves all copyright rights whatsoever.

FIELD OF THE INVENTION

This invention relates generally to data compression and decompression and more specifically to a method for encoding color graphics image data according to sets of similar colors.

BACKGROUND OF THE INVENTION

Still color graphics images are widely used for display by computer systems, especially by multimedia personal computers (PCs). As the degree of resolutions provided and the number of colors capable of being represented in an image get higher, the size of the data representing the color graphics image grows larger. Also, as bigger computer monitors are used, users require the display of larger images. Reduction of the memory space needed to store color graphics images and reduction of the time needed to transmit and display such images has been, and continues to be, an important goal in computer graphics technology.

FIG. 1 is a prior art diagram of a color graphics image and its associated storage representation. A bitmap image 10 has n lines of m pixels per line. Typically, both n and m are divisible by eight. Hence, the bitmap image 10 can be logically divided up into square blocks of 8 pixels by 8 pixels. Thus, there are m/8 blocks across the horizontal axis of the bitmap image, and n/8 blocks down the vertical axis of the bitmap image, or (m/8 * n/8) 8×8 blocks in the bitmap image. A given 8×8 block can be referenced by a (i, j) pair, where i is in the range 0 to (m/8−1), and j is in the range 0 to (n/8−1).

Each 8×8 block 12 therefore contains 64 pixels. Each pixel is represented as a RGBA quadruplet 14. The RGBA quadruplet 14 includes a red color value (R) 16, a green color value (G) 18, a blue color value (B) 20, and a brightness value (A) 22. The color and brightness of the pixel are determined by the R, G, B, and A values. For most color images, an 8×8 block contains 5 to 12 different colors. Each of the R, G, B, and A values is stored in an eight-bit byte. Therefore, each pixel occupies 4 bytes of storage, and an 8×8 block occupies 256 bytes of storage. Accordingly, the bitmap image 10 requires 256 * (m/8 * n/8) bytes of storage. For example, if the bitmap image is 640 pixels per line by 480 lines, the size of uncompressed bitmap image data is 256 * ($^{640}/_8$ * $^{480}/_8$), which is 1,228,800 bytes. For a bitmap image of 1280 pixels per line by 1024 lines, the size of the uncompressed bitmap image is 256 * ($^{1280}/_8$ * $^{1024}/_8$), which is 5,242,880 bytes. Hence, uncompressed bitmap images require large amounts of storage.

One method of still image compression was devised by the Joint Photographic Experts Group (JPEG), a group sanctioned by the International Standards Organization (ISO). The JPEG compression standard is a lossy image compression algorithm that reduces the size of bitmapped images with little discernable image degradation. Lossy compression methods reduce the size of the image by disregarding some pictorial information. In contrast, lossless compression methods reduce the number of bits an image would normally require without losing any data. The JPEG compression algorithm converts a color image into rows of pixels, each pixel having numerical values representing brightness and color as described above. The image is broken down into blocks, each block being 16 pixels by 16 pixels, and then reduced to blocks of 8 pixels by 8 pixels by subtracting every other pixel in each block. The compression algorithm uses a formula that computes an average color value for each block, permitting it to be represented with less data. To retrieve the image data, the process is simply reversed to decompress the image.

Although widely used, the JPEG standard has disadvantages. The JPEG algorithm uses Fourier transformation, Hoffman coding, "zigzagging", and YUV transformation calculations to compute local average color values for related pixels in the image. The algorithm represents each color used in a row of pixels in the image as a curve. The local average color values are computed by calculating cosine functions and by multiplying floating point coefficients for terms of the polynomial equation representing the curve. These computations are relatively slow, negatively affecting the overall image compression and decompression speed. A faster method of compressing and decompressing color graphics images is needed which does not require floating point computation of cosine functions and multiplication operations. Furthermore, a method which provides a good compression ratio and allows for a high degree of parallelism during decompression would be a valuable addition to the computer graphics art.

SUMMARY OF THE INVENTION

An embodiment of the present invention provides a method for compressing and decompressing graphics image data. The method of compressing a block of graphics image data into a compressed block, the block having a plurality of lines, each line having a plurality of columns, each column including a pixel, each pixel having a color represented by red, green, blue, and intensity values, includes the steps of building an array of color ordinal numbers by identifying all colors present in the pixels of the block, each color ordinal number representing one of the colors, the array of color ordinal numbers including one of the color ordinal numbers corresponding to the color of a pixel for each pixel in the block; storing the red, green, blue, and intensity values for a selected one of the colors in the compressed block; building a set of group flags indicating lines in the block having pixels of the selected color according to the array of color ordinal numbers; storing the set of group flags in the compressed block; building at least one set of line flags indicating columns having pixels of the selected color within lines in the block having pixels of the selected color according to the array of color ordinal numbers, each line having pixels of the selected color being represented by one of the set of line flags; storing the set of line flags in the compressed block; and repeating these steps for all colors in the block.

The method of decompressing a compressed block of graphics image data into an uncompressed block includes the steps of getting the red, green, blue, and intensity values for a selected color from the compressed block; getting the set of group flags for the selected color from the compressed block; getting a set of line flags corresponding to one of the set of group flags indicating the presence of the selected color in at least one line of the compressed block; writing the red, green, blue, and intensity values into the uncompressed block at selected locations indexed by columns having the selected color as indicated by the set of line flags and by lines having the selected color as indicated by the set of group flags; repeating these steps for each flag in the set of group flags indicating the presence of the selected color in at least one line of the compressed block; and repeating the above steps for all distinct color combinations of the compressed block.

Additional advantages and novel features of the invention will be set forth in part in the description which follows, and will become apparent to those skilled in the art upon examination of the following, or may be learned by practice of the invention.

According to another embodiment of the present invention, the foregoing and other advantages are attained by a system for compressing a block of graphics image data into a compressed block, the block having a plurality of lines, each line having a plurality of columns, each column including a pixel, each pixel having a color represented by red, green, blue, and intensity values. The apparatus includes means for building an array of color ordinal numbers by identifying all colors present in the pixels of the block, each color ordinal number representing one of the colors, the array of color ordinal numbers comprising one of the color ordinal numbers corresponding to the color of a pixel for each pixel in the block; means for building a first set of flags indicating lines in the block having pixels of a selected color according to the array of color ordinal numbers; means for building at least one second set of flags indicating columns having pixels of the selected color within lines in the block having pixels of the selected color according to the array of color ordinal numbers, each line having pixels of the selected color being represented by one of the second set of flags; and means for storing the red, green, blue, and intensity values, the first set of flags, and the at least one second set of flags for a selected one of the colors in the compressed block.

In another embodiment of the present invention, the foregoing and other advantages are attained by a system for decompressing a compressed block of graphics image data into an uncompressed block, the compressed block having a plurality of distinct red, green, blue, and intensity values color combinations, each distinct color combination having a set of group flags representing the presence of the distinct color combination in lines of the uncompressed block and at least one set of line flags representing the presence of the distinct color combination in columns of the uncompressed block for lines of the uncompressed block having the distinct color combination. The apparatus includes means for reading the red, green, blue, and intensity values for a selected color from the compressed block, the set of group flags for the selected color from the compressed block, and a set of line flags corresponding to a group flag in the set of group flags indicating the presence of the selected color in at least one line of the compressed block; and means for writing the red, green, blue, and intensity values into the uncompressed block at selected locations indexed by columns having the selected color as indicated by the set of line flags and by lines having the selected color as indicated by the set of group flags.

Still other objects and advantages of the present invention will become readily apparent to those skilled in the art from the following detailed description, wherein is shown and described only the preferred embodiment of the invention, simply by way of illustration of the best mode contemplated for carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

DESCRIPTION OF THE DRAWINGS

FIG. 2 is a diagram of an example 8×8 block with the RGBA quadruplets represented as ordinal numbers according to the present invention.

FIG. 3 is a diagram illustrating the mapping of ordinal numbers to RGBA quadruplets.

FIG. 4 is a textual representation of a data structure for the example block of FIG. 2.

FIG. 5 is a diagram of the example data structure of FIG. 4 as stored in computer memory.

DETAILED DESCRIPTION OF THE INVENTION

Figure 1:
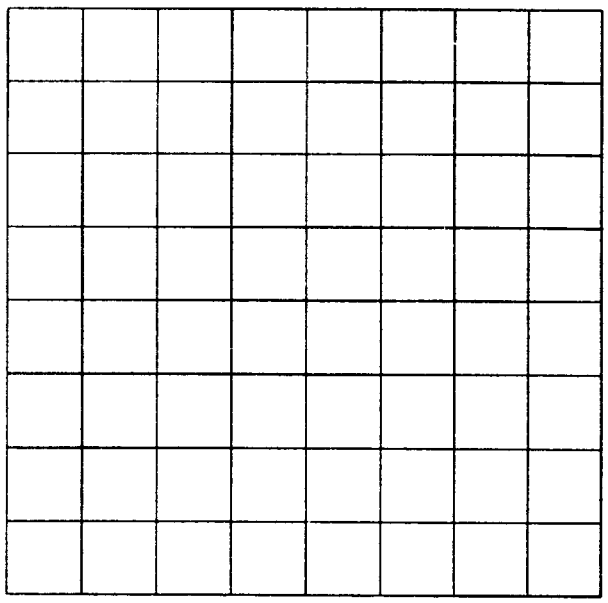
FIG. 1 is a diagram of a color graphics image and its associated storage representation (Prior Art).
Figure 1:
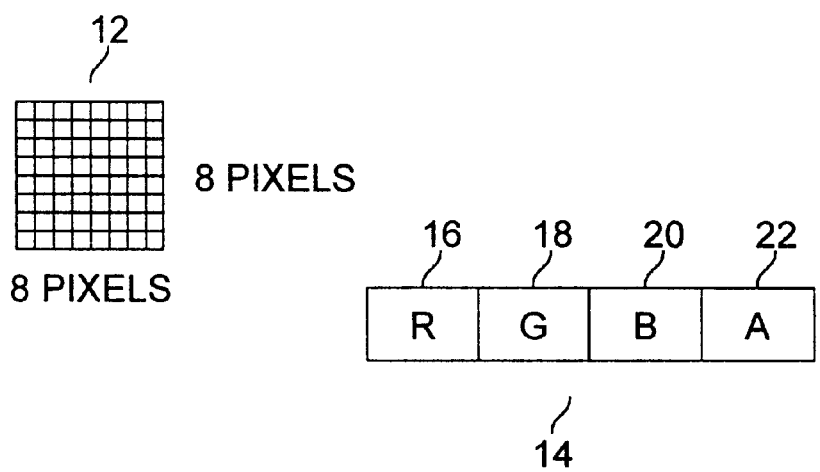

The present invention operates on uncompressed bitmap image data, such as is shown in FIG. 1, to generate a compressed representation of the image. It also operates on compressed bitmap image data to generate the original, uncompressed representation. Generally, to compress an image, the present invention individually processes all blocks of 8 pixels by 8 pixels of the image in sequence. For each block, all distinct colors present in the block are identified and assigned an ordinal number. A data structure for the block is generated to store the number of distinct colors present in the block, a compression image quality mask value (to be discussed further below), the actual RGBA quadruplet for each color present in the block, and sets of group and line binary flags indicating the presence of a particular color at a particular pixel within the block. The resulting data structure requires significantly less storage than the set of original RGBA quadruplets for the block. The data structure for the block is then stored in memory or in a computer file and the next block of the image is processed. This process is repeated for all blocks of the bitmap image. To decompress the image, the RGBA quadruplets of all pixels within each block are reconstructed from the data structure for the block. This reconstruction is repeated for all blocks in the image.

The representation of the compressed image data according to the present invention may be best understood by reference to a simple example. FIG. 2 is a diagram of an example 8×8 block with the RGBA quadruplets represented as ordinal numbers according to the present invention. Block 24 represents one 8×8 block from a bitmap image. It is also called a color ordinal table. It has indices in the horizontal direction from 0 to 7 and in the vertical direction from 0 to 7. Alternatively, it can be represented as a 64-element one-dimensional array. The pixels of the block are scanned to determine what distinct colors are represented in the block. Each distinct color found is assigned an ordinal number. FIG. 3 is a diagram illustrating the mapping of ordinal numbers to RGBA quadruplets. For example, ordinal number one indicates a color composed of red value R1, green value G1, blue value B1, and brightness value A1. Ordinal number two indicates a color composed of red value R3, green value G3, blue value B3, and brightness value A3. Each RGBA combination is a unique color and brightness specification for at least one pixel in the current block. The other colors found in the example block are mapped as shown. Referring back to the example of FIG. 2, the color ordinal table shows that a first color is found in row 0, column 1; row 5, columns 0 and 2–7; and row 6, columns 2–5. A second color is found in row 3, columns 0 and 6; row 4, columns 0–4; row 5, column 1; and row 6, columns 0–1. A third color is found in row 0, columns 0, and 2–3; row 1, columns 1, 3, and 5; row 2, columns 0–7; and row 6, columns 6–7. The remaining colors are identified in a similar manner. In the example shown in FIG. 2, six different colors are represented in the block 24. The occurrences of each color in the block can be represented as a set of binary flags, with each flag indicating the presence or absence of the specified color in a line of the block by a bit in the compressed block. Additional sets of flags can be generated for each line having a specified color which indicates all columns corresponding to the selected line having the specified color.

Given the representation of the block 24 in FIG. 2, sets of flags for each color found in the block can be generated and stored in a data structure for the block. For example, the first color is found in lines 0, 5 and 6. Hence, a set of binary flags for these lines in the block can be generated for the first color having the value {10000110}. These flags are called group flags. Each position in the set of group flags represents a line in the block, starting with the zero'th line and continuing until the seventh line. A one in a set position indicates that the selected color is present somewhere in the line, a zero in a set position indicates that the selected color is not present in the line. For each line having the selected color, a set of binary flags is generated indicating the presence of the selected color in each column of the current line. These flags are called line flags. For example, the first color is found only in the column 1 of line 1. Hence, a set of binary flags having the value {01000000B} is generated to represent the fact that the first color is found in column 1, but not in any other columns of the line. Similarly, a set of binary flags having the value {10111111B} is generated to represent the existence of the first color in columns 0, and 2–7 of line 5, and a set of binary flags having the value {00111100B} is generated to represent the existence of the first color in columns 2–5 of line 6. This process of set generation is performed for all colors found in the block. When all colors have been processed, a data structure for the block has been fully generated which takes significantly less storage than prior methods and which does not require any cosine function evaluation or floating point coefficient multiplication operations.

FIG. 4 is a textual representation of a data structure for the example block of FIG. 2. Each field of the data structure is stored in one byte of memory. The N field 30 indicates the number of distinct colors found in the block. In this example, the number of colors is six. The Mask Value field 32 is used when comparing sets of similar colors. It will be described in further detail below. The R1, G1, B1, and A1 bytes 34 hold the R, G, B, and A values for the first color. In the case of lossless compression, the R, G, B, and A values are stored in four bytes, as in the original block. In the case of lossy compression, each component is stored in four bits. In that case, the R, G, B, and A values are stored in two bytes. The Group1 field 36 contains bits indicating the presence of the first color in the lines of the block. As discussed above, the first color is found in lines 0, 5 and 6. Hence, a set of group flags for the Group1 field 36 is generated for the first color having the value {10000110B}. The least significant bit represents the bottom line of the block. Since the first color is found in three lines, three additional sets of binary flags are needed to represent the columns in those three lines where the first color is found. Therefore, the data structure includes three sets of line flags: Line10 38, Line 15 40, and Line 16 42. The numerals in the field name indicate the group number and the line number (e.g., Line10 is group number 1, line 0; Line 15 is group number 1, line 5; and Line16 is group number 1, line 6). As previously discussed, the value {01000000B} is generated to represent the fact that the first color is found in column 1, but not in any other columns. This value is stored in the Line10 field 38. Similarly, the value {10111111B} is generated to represent the existence of the first color in columns 0, and 2–7 of line 5, and stored in the Line 15 field 40. The value {00111100B} is generated to represent the existence of the first color in columns 2–5 of line 6 and stored in the Line 16 field 42.

In this example, the fourth color is mapped to the R2, G2, B2, A2 combination 44. The fourth color is found in lines 0, 1, 3, and 4, therefore the Group2 field 46 is given the value {11011000B}. Since this color is found in four lines, four sets of line flags follow: Line20, Line21, Line23, and Line24. These fields are given the values {00001111B}, {10101011B}, {00000100B}, and {00000111B}, respectively. The second color is mapped to the R3, G3, B3, A3 combination 48. The second color is found in lines 3–6, therefore the Group3 field 50 is given the value {00011110B}. Since this color is found in four lines, four sets of line flags follow: Line33, Line 34, Line 35, and Line 36. These fields have the values {10000010B}, {11111000B}, {01000000B}, and {11000000B}, respectively. The fifth color is mapped to the R4, G4, B4, A4 combination 52. The fifth color is found in line 3, therefore the Group4 field 54 is given the value {00010000B}. Since the fifth color is found in only one line, one set of line flags follows: Line43. This field is given the value {01111001B} to reflect that the fifth color is found in columns 1–4 and 7 of line 3. The sixth color is mapped to the R5, G5, B5, A5 combination 56. The sixth color is found in line 7, therefore the Group 5 field 58 is given the value {00000001B}. Since the sixth color is found in only one line, one set of line flags follows: Line 57. This field is given the value {11111110B} to reflect that the sixth color is found in columns 0–6 of line 7.

The third color is mapped to the R6, G6, B6, A6 combination 60. However, the third color is not accompanied by a set of group flags or sets of line flags. The information describing the positions of the third color in the block can be reconstructed during the decompression process. These locations are the pixels in the block left over after all of the other colors have been processed. Therefore, specification of pixels having this color is unnecessary.

FIG. 5 is a diagram of the example data structure of FIG. 4 as stored in computer memory. This example uses lossy compression, with the R, G, B, and A values stored in a total of two bytes. For this example, the total number of bytes needed to store the compressed data representing the block is 32. Since the uncompressed block required 256 bytes, operation of the present invention yielded a compression ratio of 8:1 for the sample block.

Figure 6:
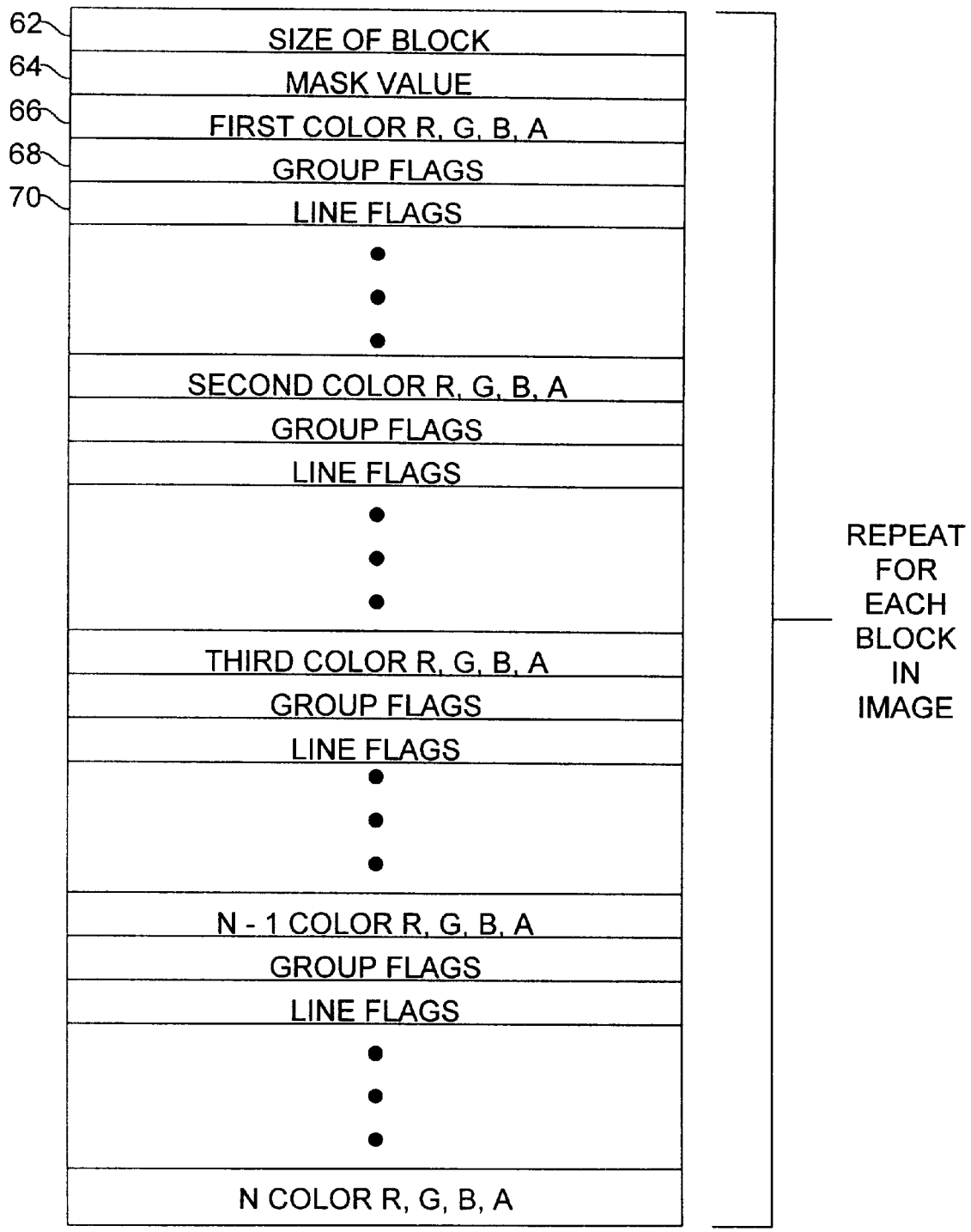
FIG. 6 is a diagram of a generalized data structure for storing a compressed block according to the present invention.

FIG. 6 is a diagram of a generalized data structure for storing a compressed block according to the present invention. The size (in bytes) of the compressed block 62 is stored along with a mask value 64. For each color in the block, the R, G, B, and A values 66 are stored, and a set of group flags 68 is generated. For each line having the current color, a set of line flags 70 is generated to store the position of the current color in the line. This data structure is repeated for all blocks in the bitmap image.

The present method of constructing a data structure for a block of image data during compression has two exceptions. If the block has only one color, then there is only one RGBA color group and the format of the data structure is {N=4, mask value, RG, BA}. Hence, the block can be represented with only four bytes for lossy compression, and six bytes for lossless compression. If there are 64 RGBA color groups (meaning each pixel is a different color), then the format is {N=130, mask value, R1G1, B1A1, R2G2, B2A2, R3G3, B3A3, . . . R64G64, B64A64). However, in practice it is unlikely that an 8×8 block will have each pixel of a different color.

Referring back to FIG. 4, the mask value field 32 holds the number of mask bits used when comparing the colors of two pixels in a block. The mask value is used during compression of an uncompressed block and is passed to the decompression function for use during decompression of a compressed block. In the preferred embodiment of the present invention, the default value of mask value is 16D, or 00010000B. This means that the least significant four bits of each R, G, B, and A value are masked when comparing colors. That is, only the four most significant bits of each R, G, B, and A value are compared for each pixel. This results in two colors that are similar but not identical being considered the same color for compression purposes. The mask value is a variable that can be set by the user of the compression algorithm. More formally, two RGBA quadruplets, RpGpBpAp and RqGqBqAq, are considered equal in color if Rp div mask value=Rq div mask value, Gp div mask value=Gq div mask value, Bp div mask value=Bq div mask value, and Ap div mask value=Aq div mask value. When the mask value is set to zero, no masking takes place. This is lossless compression and the decompressed image has the best quality because it includes all of the original information. However, the resulting compression ratio is lower for this case. When the mask value is set to 16D, the quality of the decompressed image is not quite as good as when the mask value is zero, but the compression ratio is better. At the default value for the present invention, most users cannot detect degradation of the image quality after compression and decompression operations have been performed. The user can select the mask value based on user preferences of compression ratio vs. image quality. The lower the mask value, the fewer distinct colors that are considered the same color for compression purposes and the lower the compression ratio; the higher the mask value, the more distinct colors that are considered the same for compression purposes and the higher the compression ratio.

Figure 7:
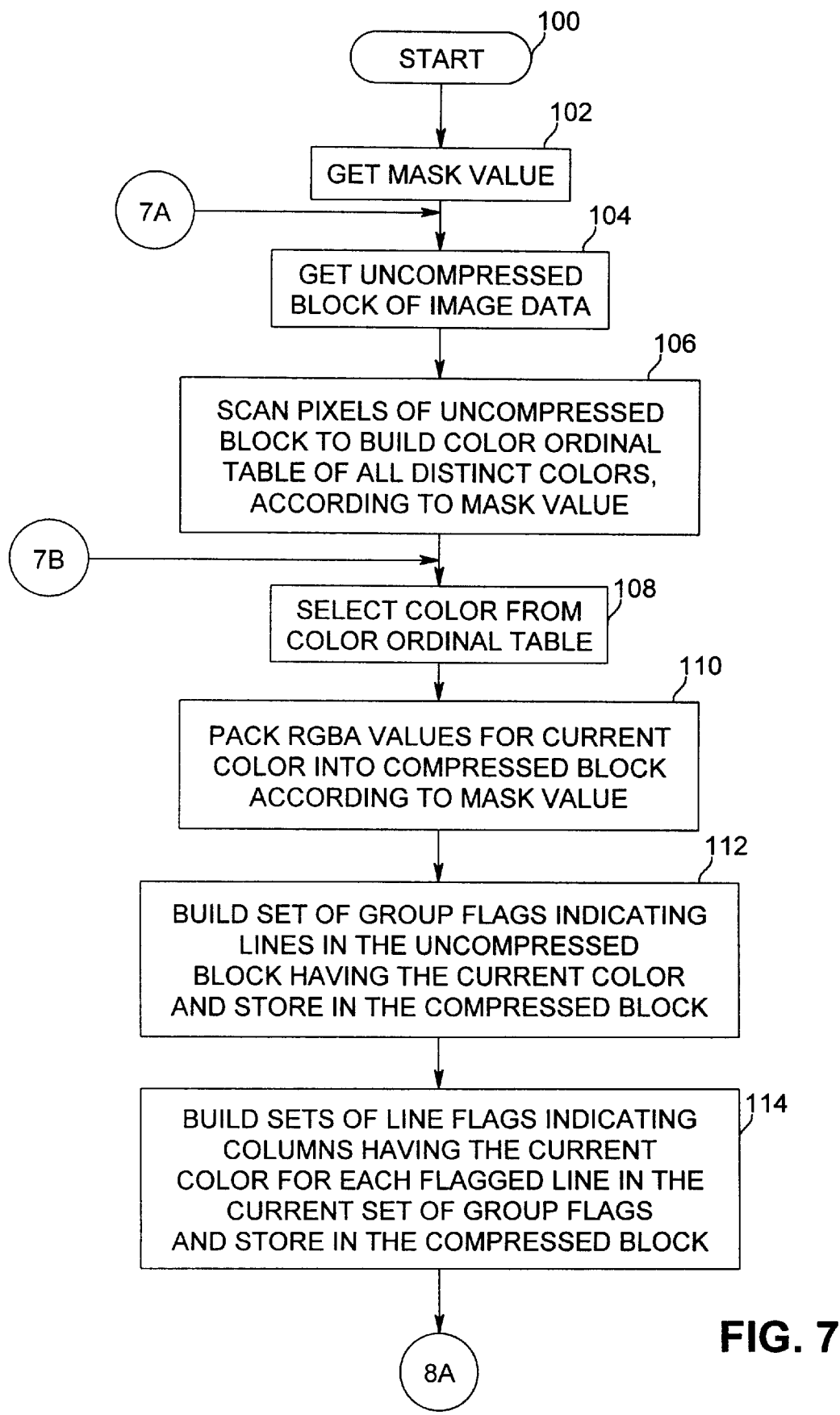
FIGS. 7–8 are high level flow charts of the steps for compressing image data according to the present invention.
Figure 8:
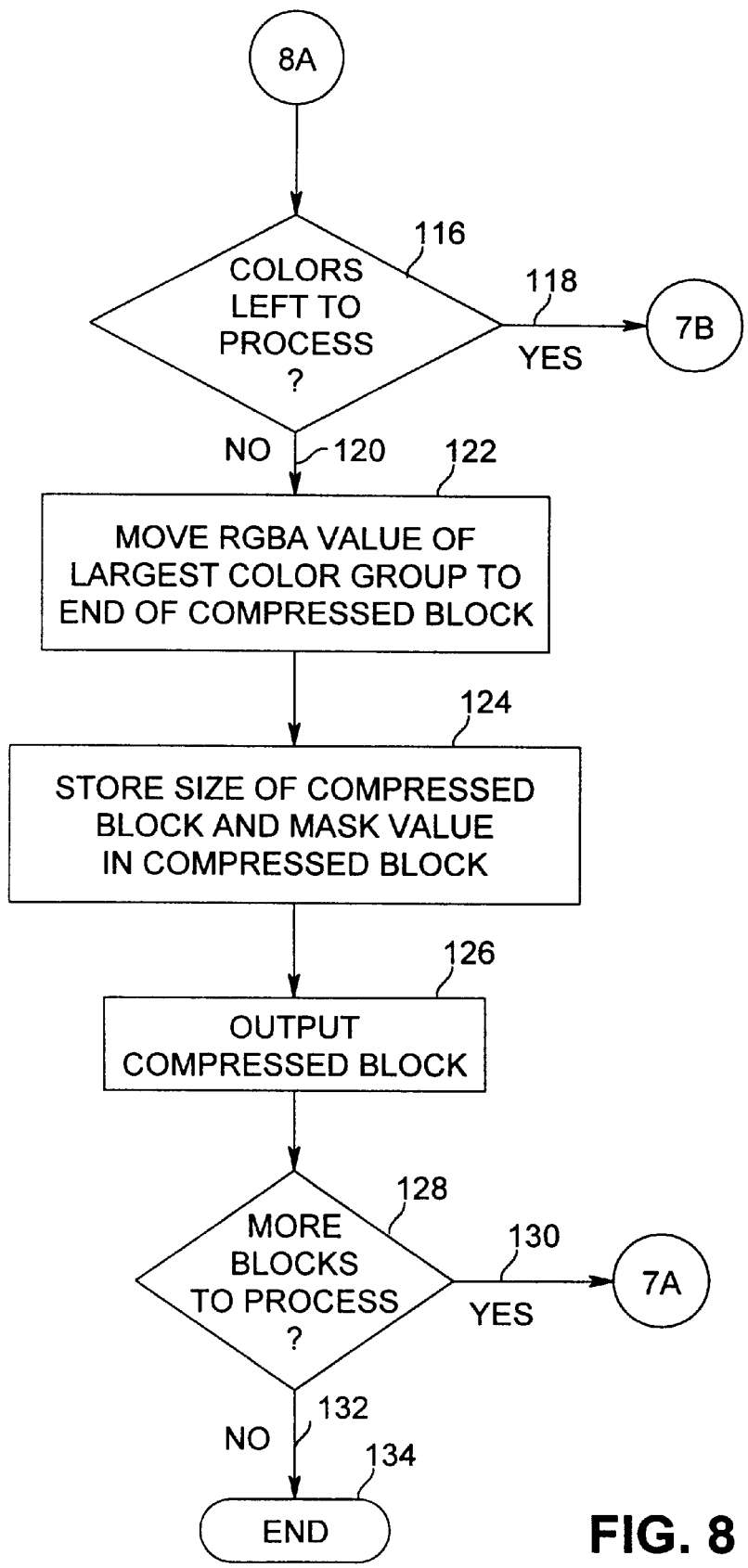

FIGS. 7–8 are high level flow charts of the steps for compressing image data according to the present invention. After compression Start step 100, the mask value for this compression operation is obtained at step 102. The mask value may be set by a user of the compression method based on the desired compression ratio and resulting decompressed image quality. Alternatively, the mask value may be preset to a default value, such as 16D. The mask value may be the same for all blocks in the image to be compressed, or a new mask value may be specified for each block. An uncompressed 8 pixel × 8 pixel block of image data is obtained at step 104 for compression processing. Typically, the image data is stored in a file on a computer system, the file is opened and the first block of image data is read from the file.

At step 106, the 64 pixels of the uncompressed block are scanned to build a color ordinal table (similar to the example table shown in FIG. 2) of all distinct colors, according to the mask value. The colors present in the block are identified and each pixel is assigned an ordinal number of the color present in the pixel. Two pixels are considered to be of the same color if the RGBA values of the pixels differ by less than the mask value. Once the color ordinal table for the block is built, the first color from the color ordinal table is selected at step 108. This is the color to be processed first when constructing the data structure holding the compressed image data for the block. Next, at step 110, the RGBA values for the current color being processed are extracted from the uncompressed block of image data and stored into the compressed block data structure according to the specified mask value. The compressed block data structure is shown in FIG. 6. The color ordinal table is then scanned at step 112 to build a set of group flags indicating lines in the uncompressed block having the current color. Since there are eight lines in the block, a set of eight binary flags is sufficient to indicate the presence or absence of the current color in the block's lines. The set of group flags can be stored in an 8-bit byte. The set of group flags is then stored in the compressed block. At step 114, the color ordinal table is processed to build one or more sets of line flags indicating columns having the current color for each flagged line in the current set of group flags. That is, for every line in the block that has its associated bit set in the set of group flags, a set of lines flags is generated. Since there are eight columns in the block, a set of eight binary flags is sufficient to indicate the presence or absence of the current color in the columns of the selected line. The set of line flags is stored in an 8-bit byte. All sets of line flags corresponding to set bits in the set of group flags are stored in the compressed block. Compression processing continues on FIG. 8 via connector 8A.

At test step 116 on FIG. 8, if there are more colors left to process in the color ordinal table, then Yes path 118 is taken to step 108 on FIG. 7 via connector 7B. At step 108, the next color to be processed is selected from the colors in the color ordinal table and this color is processed as described above. If no more colors are left to be processed, then No path 120 is taken to step 122. As an optimization feature of the present invention, the color that appears most frequently in the original block of image data is represented as the last color in the compressed block, with the set of group flags and sets of line flags omitted. During decompression processing, this color is assumed to be located in all pixels not referenced by other sets of group flags and sets of line flags. Therefore, the RGBA values of the largest color group are moved to the end of the compressed block at Step 122, and other bytes of the compressed block are moved so as to compact the block and fill in the gap in storage left by the largest color group, if necessary. At step 124, the size of the compressed block and the mask value used during processing of the block, are stored in the compressed block. The compressed block is then output at step 126. Typically, this output operation entails writing the compressed block to a file for storing the compressed image data. If more blocks of the image data need to be processed at test step 128, then Yes path 130 is taken to step 104 on FIG. 7 via connector 7A. At step 104, the next uncompressed block of image data is obtained for compression processing. Otherwise, No path 132 is taken to End step 134 and compression processing is complete for the image data.

Table I describes pseudo-code for compressing a block of image data according to the present invention. A "C" language implementation of the compression algorithm of the present invention is disclosed in Appendix A.

TABLE I

Figure 9:
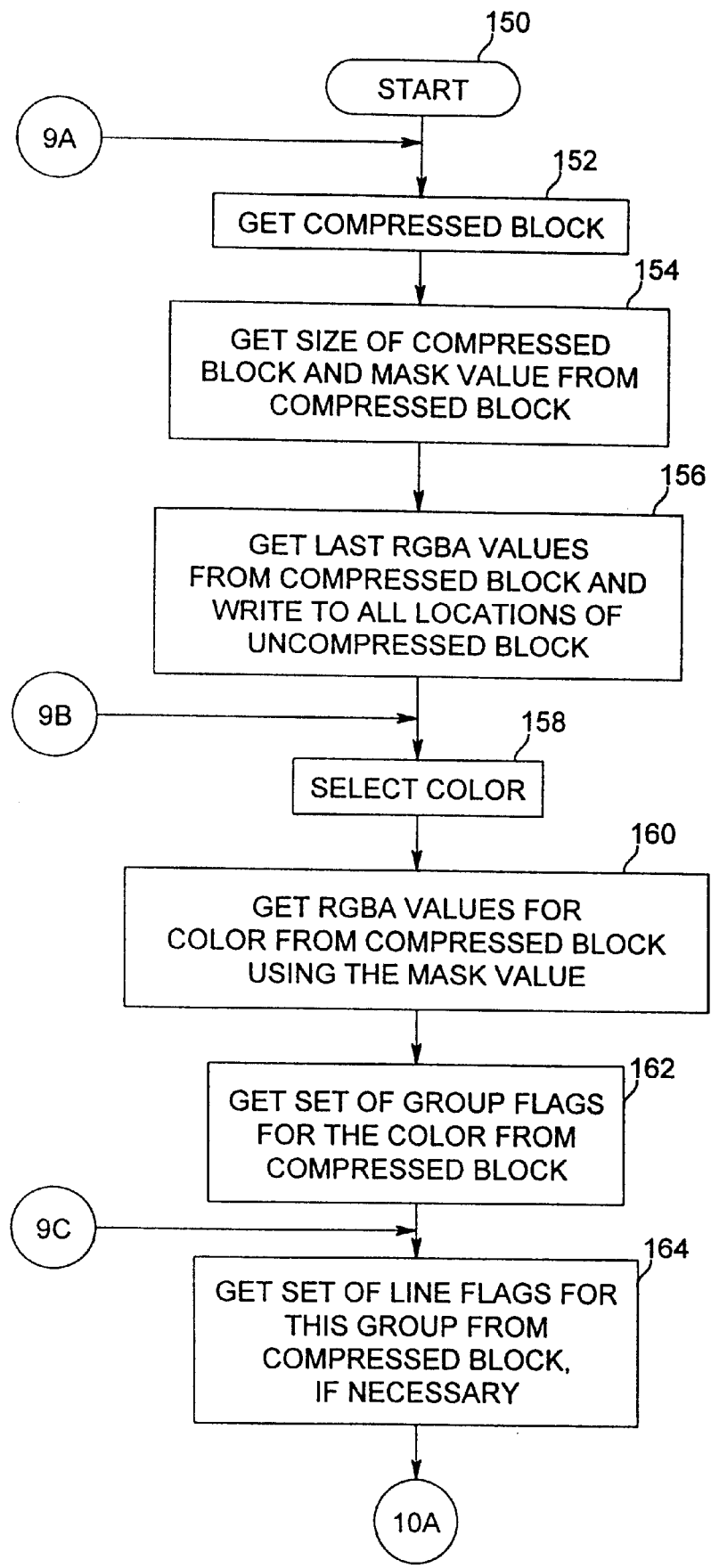
FIGS. 9–10 are high level flow charts of the steps for decompressing previously compressed image data according to the present invention.
Figure 10:
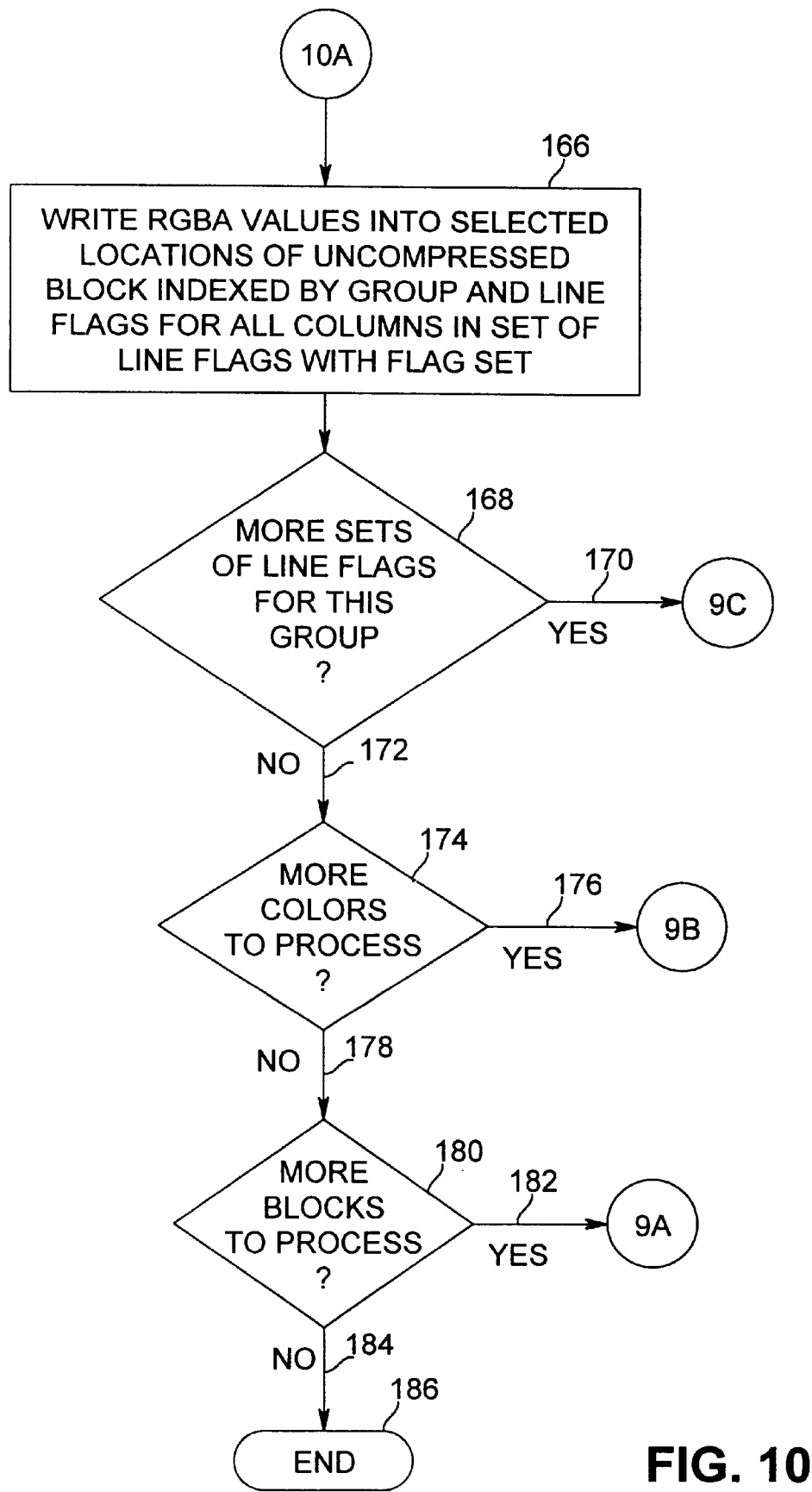

© 1997 Fujitsu Microelectronics, Inc.
Create Color Ordinal Table data structure
Create Compressed Block data structure
Set Mask Value
Initialize Color Ordinal Table
Initialize Compressed Block
Set Number Of Different Colors to 0
Set Number Of Currently Marked Color Ordinal Table Elements to 0
Begin:
For i in 0 to 63 loop           // build Color Ordinal Table
    If Color Ordinal Table [i] = 0 then
        Increment Number Of Different Colors
        Save RGBA values from the input data for the current
        pixel in c
        For k in i to 63 loops
            If Color Ordinal Table [k] = 0 then
                Insert A2 missing
                    if c div Mask Value = RGBA values
                    of k'th pixel in input data div Mask Value,
                    then
                        Set Color Ordinal Table [k] to Number
                        Of
                        Different Colors
                        Increment Number Of Currently Marked
                        Color Ordinal Table Elements
                    End if
            End if
        End loop
        Go to Continue
    End if
End loop
Continue:
If Number Of Currently Marked Color Ordinal Table Elements < 64
    then go to Begin           / /not done yet
End if
For i in 1 to Number Of Different Colors loop      / /process colors
    Set New Line flag to true
    Set Already Worked On Current Color flag to false
    For j in 0 to 63 loop        / /process Color Ordinal Table
        If New Line is true then
            Set Line Flag Index to left-most bit
            Set New Line to false
        End if
        If Color Ordinal Table [j] = i then
            If Already Worked On Current Color flag is false
            then
                Get R, G, B, and A values for current pixel and
                store them into Compressed Block
                Set index of Group Flags in Compressed Block
                Set Already Worked On Current Color flag to
                true
                Set index of first set of Line Flags in the
                RGBA group in Compressed Block
            End if
            Set the bit referenced by Line Flag Index in the i
            color's current set of Line Flags in Compressed
            Block to 1
            If Already Worked On Current Color is true then
                Set the bit for current line in the set of
                Group Flags in Compressed Block to 1
            End if
        End if
        Shift Line Flag Index 1 bit to the right
        If Line Flag Index = 0 then
            Increment index of Group Flags
            Set Line Flag Index to left-most position
        End if
    End if
    If length of Compressed Block > maximum length then TABLE I-continued Set Too Long Block to true
        Go to Final
    End if
End if
Move RGBA values of largest color group to the end of the
Compressed Block
Final:
If Too Long Block is true then
    Pack RGBA values of all colors into Compressed Block
End if
Store size of Compressed Block in Compressed Block
Store Mask Value in Compressed Block FIGS. 9–10 are high level flow charts of the steps for decompressing previously compressed image data according to the present invention. The decompression steps are usually performed when display of a compressed image is desired. After decompression Start step 150, a compressed block of image data is obtained for decompression processing at step 152. Typically, the compressed block is stored in a file on a computer system, the file is opened and the first compressed block of image data is read from the file. The size of the compressed block and the mask value are extracted from the first two storage locations of the compressed block at step 154. At step 156, the last RGBA values in the compressed block are extracted and written into all locations of the uncompressed block to be output by decompression processing. Subsequent writes to selected locations in the uncompressed block will overwrite the default color, but since this color is the most frequently used color in the block, storage and decompression processing time are saved by this step. At step 158, the first color of the compressed block is selected. The RGBA values for this color are extracted from the compressed block using the mask value at step 160. Next, at step 162, the set of group flags for this color is extracted from the compressed block. If the set of group flags has any bits set (indicating that this color is found in the corresponding line of the block), then a set of line flags for this color group is extracted from the compressed block at step 164. Processing of this color continues with step 166 on FIG. 10 via connector 10A.

At step 166, the RGBA values are written into the uncompressed block at selected locations indicated by the combination of the group and line flags for all columns in the set of line flags with set bits. Recall that each set of line flags indicates the presence of the current color in columns of the current line of the block. If a column bit is set for a particular line, then the RGBA values are written into the location for the selected pixel in the uncompressed block. Next, at test step 168, if more sets of line flags exist for the current color group, then Yes path 170 is taken to step 164 on FIG. 9 via connector 9C to get the next set of line flags for this color. Otherwise, No path 172 is taken to test step 174. At this step, if more colors are left to be processed for the current block, then Yes path 176 is taken to step 158 on FIG. 9 via connector 9B for selecting the next color. Otherwise, No path 178 is taken to test step 180. At test step 180, if there are more blocks to process for this compressed image, then Yes path 182 is taken to step 152 on FIG. 9 via connector 9A for getting the next compressed block to process. If all blocks of the image have been processed, then No path 184 is taken to End step 186 and decompression processing is complete.

Table II describes pseudo-code for decompressing a previously compressed block of image data according to the present invention. A "C" language implementation of the decompression algorithm of the present invention is disclosed in Appendix B.

TABLE II

© 1997 Fujitsu Microelectronics, Inc.
Get the size of the Compressed Block
Get the Mask Value
If the size of the Compressed Block is 130 then
    Extract the 64 sets of RGBA values using the Mask Value
    Store the RGBA values into the output, uncompressed block
    Return the size of the Compressed Block and exit
End if
Extract last RGBA values from the Compressed Block using the Mask Value
Store the last RGBA values into all locations in the uncompressed block
If the size of the Compressed Block is four then
    return the size of the Compressed Block and exit
End if
Beg:
Initialize index into Compressed Block
If index is at end of the block then
    goto Fin
End if
Extract first RGBA values from the Compressed Block
Extract set of Group Flags from the Compressed Block
Set Group Flag's bit index to left-most bit
Nach:
Extract Line Flag bit indicated by Group Flag's bit index
If Line Flag is set then    / /current line has this color
    Extract set of Line Flags
    Set Line Flag's bit index to left-most bit
    For j in 0 to 7 loop    / /across columns
        If Column Flag is set then    / /current column has this
            Store RGBA values to uncompressed block / / color
        End if
        Shift Line Flag's bit index one bit to the right
        Increment index for output writes to uncompressed block
    End loop
Else skip to next line
End if
Shift Group Flag's bit index one bit to the right
If Group Flag's bit index = 0 then
    goto Beg;    / /we are done with current color
Else goto Nach:    / /continue processing same color
Fin:
Return the size of the Compressed Block and exit The present invention was applied to several sample bitmap images with a default mask value of 16D (that is, four bits were masked off each R, G, B, A value). Thus, lossy compression was tested, but the mask value was set such that no degradation of image quality was noticeable. First, the sample image was compressed, and then the compressed representation of the image was decompressed. The sample images were 640 pixels × 480 pixels in size, with 32 bits representing each pixel. The compression/decompression operations were also timed during execution by a PC. For comparison purposes, compression and decompression operations were also performed on the same images using an implementation of the JPEG standard. The exact timing values shown below would vary when these algorithms are implemented on different computer systems, but the important statistic is the reactive difference between the results of the present invention and the JPEG standard. Table III shows the results of the compression and decompression operations, with R being the resulting compression ratio and T being the elapsed time in seconds for compression and decompression.

TABLE III

| 1. | BMP4 | present invention | R=5.95 | T=0.24 |
|---|---|---|---|---|
|    |      | JPEG              | R=5.04 | T=18.50 |
| 2. | BMP5 | present invention | R=7.28 | T=0.23 |
|    |      | JPEG              | R=5.45 | T=18.00 |
| 3. | BMP6 | present invention | R=4.91 | T=0.20 |
|    |      | JPEG              | R=4.66 | T=18.50 |
| 4. | BMP8 | present invention | R=6.82 | T=0.25 |
|    |      | JPEG              | R=5.41 | T=18.10 |

According to these test results, the compression ratio for the present invention is better than the compression ratio for the JPEG standard, although not significantly. However, the total time necessary to compress and decompress an image is dramatically less when using the present invention as compared to the JPEG standard (here, the processing time for the present invention is around 1.3% of the processing time for the JPEG standard for each image).

Figure 11:
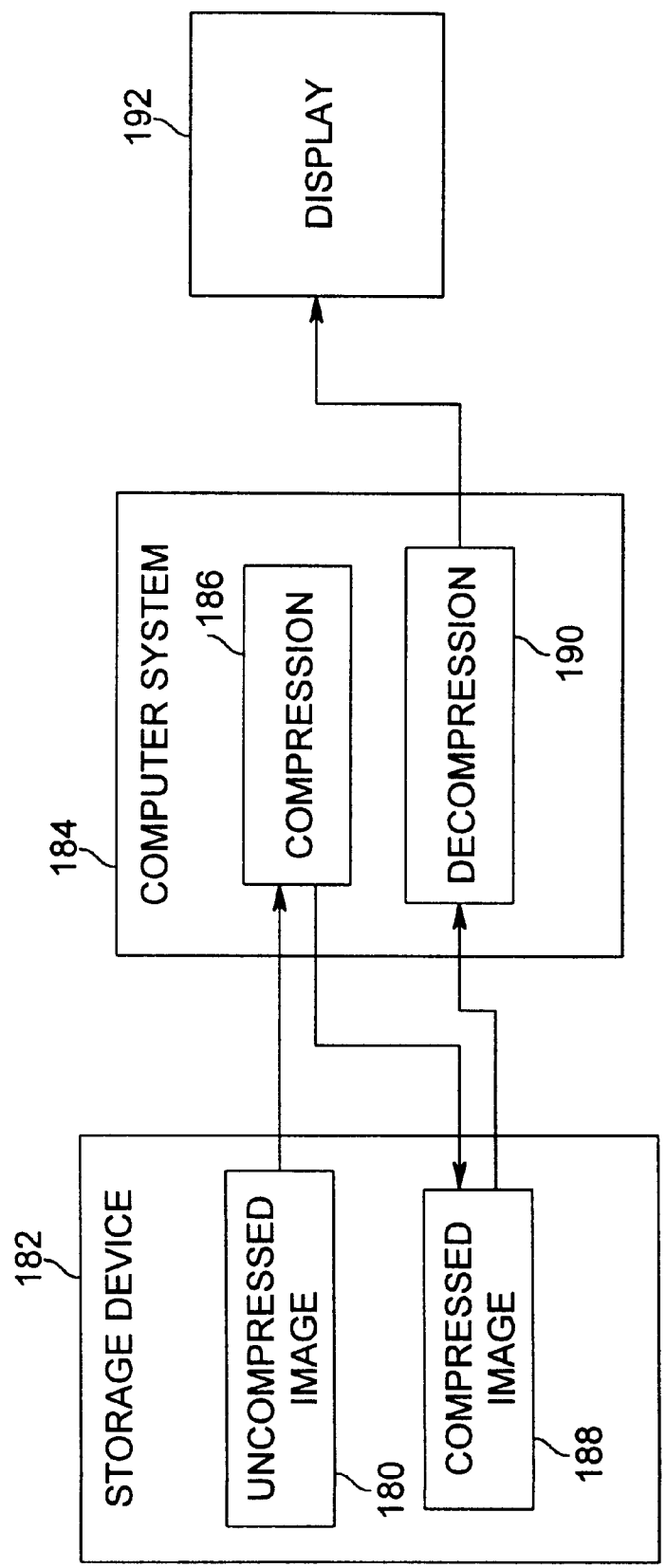
FIG. 11 is a diagram of a software embodiment of the present invention as implemented on a computer system.

A software implementation of the present invention is described above. FIG. 11 is a diagram of a software embodiment of the present invention as implemented on a computer system. An uncompressed image 180 is stored on a storage device 182 which is coupled to a computer system 184. The computer system 184 executes compression function 186 in accordance with the present invention to read uncompressed image 180 and compress it. The results of the compression operation are stored in compressed image 188 of storage device 182 for future use. Subsequently, the same computer system 184, or a different computer system (not shown), executes decompression function 190 in accordance with the present invention to read a compressed image and decompress it. The decompressed image is sent to display 192 for presentation to a user of the computer system.

Although the compression and decompression methods described above may be implemented in software executing on a general purpose computer, the preferred embodiment of the present invention is a multi-processor hardware implementation that takes advantage of the inherent paralellism available with the present method. Although both compression and decompression are important, in practice an image is typically compressed once but decompressed many times. Therefore, speed of decompression is very important. If the decompression steps can be implemented in parallel on multiple processing devices, overall decompression time can be dramatically reduced. The decompression process is generally described in the pseudo-code shown in Table IV.

TABLE IV

© 1997 Fujitsu Microelectronics, Inc.
for all blocks in the compressed bitmap image loop
    for all N color groups (m = 1, 2, . . . N) loop
        for all lines having color m present loop
            for all columns within a line
                having color m present loop
                Write RGBA quadruplet for color m
                at the current location of the uncompressed image
            end loop
        end loop
    end loop
end loop Based on the pseudo-code of Table IV, there are three possible levels to concurrently perform RGBA quadruplet write operations during decompression processing, one for each of the three inner control loops. Each RGBA quadruple write operation is independent of all other write operations, so multiple processing devices can be used in parallel to reconstruct the original bitmap image from the compressed data representation. For example, if there are eight colors present in a block of image data, then eight processors, each handling a different color, could operate in parallel to write the RGBA quadruplets for the color assigned to a given processor. Such a system provides increased decompression speed for multimedia PC applications.

Figure 12:
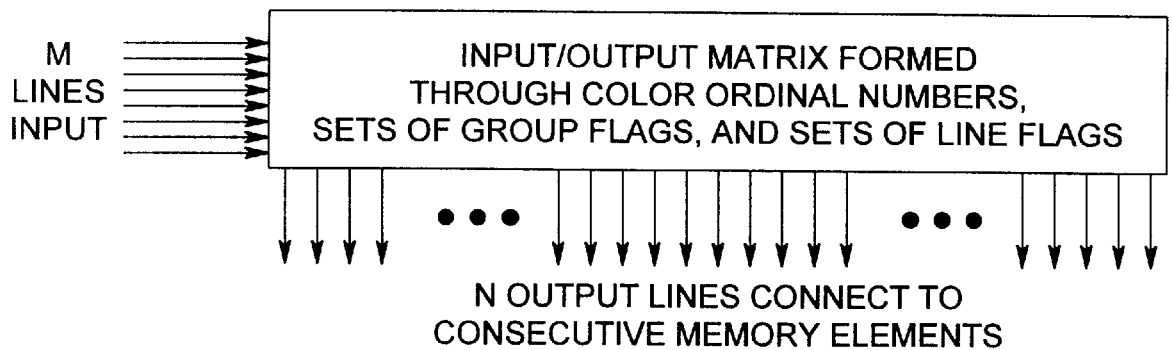
FIG. 12 is a diagram of a M*N distributor used for decompression.

In the preferred hardware embodiment, a decompression apparatus is represented in a M*N distributor with a 32-bit wide data path. FIG. 12 is a diagram of a M*N distributor used for decompression. The number of lines input to the distributor (M) is set to eight, and the number of lines output (N) is set to 64. The output lines are connected to consecutive memory elements (not shown). The number of input lines M should correspond to the actual number of color groups in the image. However, by setting M to eight and assuming that the number of color groups in the image is greater than eight, the entire set of color groups can be divided into subsets of eight and the subsets can be processed sequentially. This level of processing would not use parallelism.

For every current subset of color groups, the distributor sends data from the M inputs to the N outputs according to the values of elements in a matrix. One distributor is used for each subset of color groups. The matrix is formed with the information provided by the sets of Group Flags and sets of Line Flags. The row i of the matrix $A=\{a_{ij}\}$, $1<=i<=8$, $1<=j<=64$, corresponding to the input i, may be constructed as follows: $a_{ij}=1$ if P=1 and Q=1, $a_{ij}=0$ otherwise; where P is the value of the bit m in the set of Group Flags corresponding to color group i; m=(int)(j/8); Q is the value of the bit n in the set of Line Flags for m corresponding to color group i; and n=j%8 (i.e., residual after division by 8).

Figure 13:
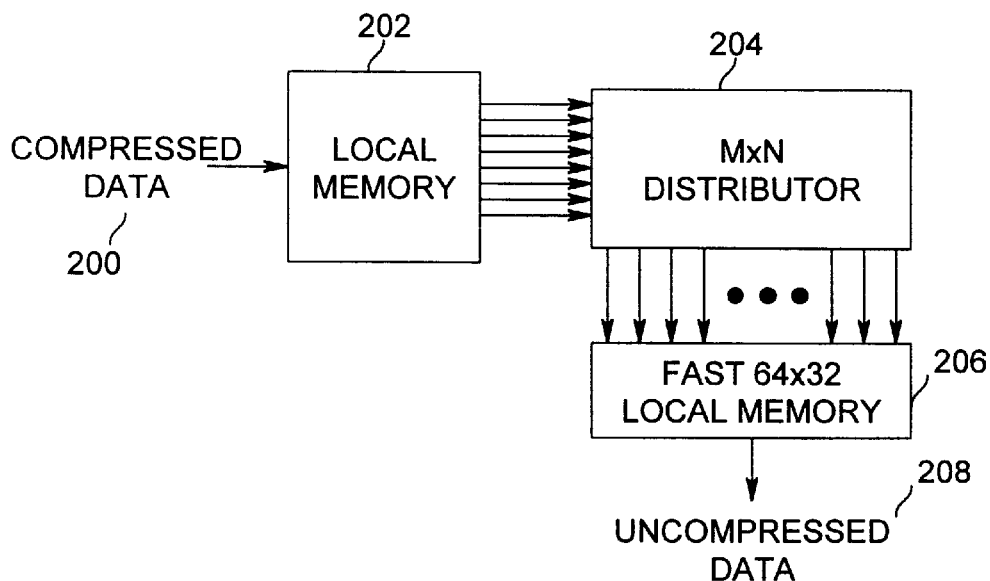
FIG. 13 is a block diagram of decompression circuitry.

FIG. 13 is a block diagram of decompression circuitry. Compressed data 200 is stored in a Local Memory 202. The Local Memory passes compressed data across M input lines to at least one M×N distributor 204, where the input/output matrix is formed by shift operations on the data. No addition or multiplication operations are required, and no floating point numbers are being manipulated. The M×N distributor 204 transfers all of the data from the M inputs to the respective N outputs, and into a Fast 64×32 Local Memory 206. Uncompressed data 208 is read out of the Fast 64×32 Local Memory for further processing, such as display of the uncompressed image on a computer monitor.

The invention has been described in its presently contemplated best mode, and it is clear that it is susceptible to various modifications, modes of operation and embodiments, all within the ability and skill of those skilled in the art and without the exercise of further inventive activity. Accordingly, what is intended to be protected by Letters Patent is set forth in the appended claims.

APPENDIX A

A C language implementation of the algorithm for compressing a block of image data.

```
© 1997 Fujitsu Microelectronics, Inc.
#define UC unsigned char
#define FL float
UC Tol Ave, TolDef; / /global variables that control
                    / /BlockIsDarkAndUniformlyColored ( )
//---------
BOOL BlockIsDarkAndUniformlyColored(LPBYTE Block, UC AveEps,
UC DefEps)
```

APPENDIX A-continued

A C language implementation of the algorithm for compressing a block of image data.

```
{float av[4]; float ot[4]; int j,k; float d;
for(j=0;j<4;j++)av[j]=ot[j]=(FL) 0;
for(k=0;k<64;k++) for(j=0;j<4;j++)av[j]+=Block]k*4+j];
for(j=0;j<4;j++)av[j]/=64;
for(k=0;k<64;k++)for(j=0;j<4;j++) {d=FL) ((FL)Block[k*4+j]-av[j]);
ot[j]+=d*d;}
for(j=0;j<4;j++)ot[j]=(FL)sqrt((double)ot[j])/(FL)64;
for(j=0;j<4;j++)if(ot[j]>AveEps)return FALSE;
for(j=0;j<4;j++)if(ot[j]>DefEps)return FALSE;
return True;}
//---------
UC Compress(UC*Input,UC*Output) / /Lossy compression
{UC* S;UC I[64]; UC Q[256]; int a,b,bM,gr,i,j,k,p,q,s,t,w,M;
int de; UC c[4]; BOOL hu,NewLine,bIs130=FALSE; UC R,G,B,A;
UC ra, rb, zv, dl, dlM;
UC Pg,Pl; / /Moving bits in Group/Line bytes
BOOL WeHaveAlreadyWorkedOnCurrentColor;
de=16;hu=BlockIsDarkAndUniformlyColored(Input,TolAve,TolDef);
if(hu)de=64;
S=Input;   / /S is input uncompressed block
for(k=0;k<64;k++)I[k]=0;for(k=0;k<256;k++)Q[k]=0;
/ /I is Color Ordinal Table, Q is output Compressed Block
w=0; / /the counter of currently marked b[k] elements
s=0; / /the counter of different colors
/ /set up color ordinal table
beg:
for(i=0;i<64;i++) / /loop through pixels in block
       {if(I[i]==0)
       {s++; / /one more new color ordinal number
       for(p=0;p<4;p++)c[p]=S[i*4+p];
       fo (k=i;k<64;k++)
            {if(I[k]==0)
               {t=0;for(q=0;q<4;q++)
                   {if(S[k*4+q]/de==c[q]/de) t++;}
                   If(t==4) {I[k]=s;w++;}}
                                              }
                   Goto con;                  }
                                              }
con:
if(w<64)goto beg; M=s; / /M is number of different colors
dlM=0;
b=2; / /current index into Q (used for Compressed Block)
for(i=1;i<M;i++) / /the loop through RGBA groups
    {a=0;NewLine=1; WeHaveAlreadyWorkedOnCurrentColor=FALSE;
    Pg=128;dl=0;
    for(j=0;j<64;j++) / /loop through elements of Color Ordinal
                    / /Table
        {if(NewLine) {ra=0;Pl=129;NewLine=0;
        zv=I[j];
        if(zv==i)
           {if(WeHaveAlreadyWorkedOnCurrentColor==FALSE)
              {R=S[a]/de;G=S[a+1]/de;B=S[a+2]/de;
              A=S[a+3]/de; / /retrieve RGBA values
              Q[b]=R*16+G;Q[b+1]=B*16+A; / /pack into 2
                                         / /bytes
              Gr=b+2; / /Index of Group byte
              WeHaveAlreadyWorkedOnCurrentColor=TRUE;
              B=gr+1; / /Index of the first Line byte in the
                              / /RGBA group
              { / /end of starting to work on this RGBA
                     / /group
              Ra=Q[b];ra|=Pl;Q[b]=ra; / /set current bit in
                         / / i-color's current Line byte
              if(WeHaveAlreadyWorkedOnCurrentColor)
                     {rb=Q[gr];rb|=Pg;Q[gr]rb;}
              / /bit is added to i-color's Group byte
              }
        Pl>>==1;
        if (PL==0)
               {Pg>>=1;if(ra!=0) {dl++;b++;} NewLine=1;}
        a+=4;
    }  / /end j-loop
    if(dl<dlM) {dlM=dl;bM=gr;}
    if(b>128) {bIs130=TRUE;goto Final;}
    }   / /end i-loop
/ /remove the largest color group and put its RGBA into the end
```

APPENDIX A-continued

A C language implementation of the algorithm for compressing a block of image data.

```
if(M>1)
    {ra=Q[bM-2];rb=q[bM-1];s=3+dlM;
    for(j=bM+dlM+1;j<b;j++)Q[j-s]=Q[j];b-=s;Q[b]=ra;b++;
        Q[b]rb;b++;
else b=4; //in case of only one RGBA
Final:
if(bIs130)
    {a=0;b=2;
    for(i=0;i<64;i++)
        {r=S[a]/de;G=S[a+1]/de;B=S[a+2]/de;A=S[a+3]/de;
        Output[b]=R*16+G;Output[b+1]=B*16+A;a+=4;b+=2;}
    goto Konec;}
else for(i=0;i<b;i++)Output[i]Q[i];
Konec:
Output[0]=b;Output[1] (UC) de;return b;}
```

APPENDIX B

A C language implementation of the algorithm for decompressing a previously compressed block of image data.

© 1997 Fujitsu Microelectronics, Inc.

```
UC Decompress (UC* Input,UC* Output) / /Lossy decompression
{int a,b,j,M; UC R,G,B,A,ra,rb,Pg,Pl,LineByte,GroupByte;
int de,d;
M=Input[0]; //size of Compressed Block, in bytes
de=Input[1];d=4;
if(m==130) / /case of special packing, without group, line info
    {a=0;b=2;for(j=0;j<64;j++)
        {R=Input[b]/16*de+d;G=Input[b]%16*de+d;
        b++;B=Input[b]/16*de+d;A=Input[b]%16*de+d;b++;
        Output[a]=R;Output[a+1]=G;Output[a+2]=B;Output[a+3]=A;
        a+=4;}return M;}
b=M-2;R=Input[b]/16*de+d;G=Input[b]%16*de+d;b++;
B=Input[b]/16*de+d;A=Input[b]%16*de+d;a=0; / /unpack RGBA values
for (j=0;j<64;j++)
    {Output[a]=R+d;Output[a+1]=G+d;
    Output[a+2]=B+d;Output[a+3]=A+d;a+=4;
if(M==4)return M;
b=2; / /start index in Input data
Beg:
if(b>=M-2)goto Fin;
a=0; R=Input[b]/16*de+d;G=Input[b]%16*de+d;b++;
B=Input[b]/16*de+d;A=Input[b]%16*de+d;b++; / / get RGBA values
GroupByte=Input[b];b++; / /extract set of Group Flags
Pg=128;
Nach:
ra=GroupByte&&Pg; / /check lines in group
if (ra!=0)
    {LineByte=Input[b];b++/ /extract set of Line Flags
    Pl=128;
    for (j=0;j<8;j++)
        {rb=LineByte%Pl; / /is current color in column?
        If(rb!=0) {Output[a]=R;Output[a+1]=G;Output[a+2]=B;
            Output[a+3]=A;} / /then write RGBA values
        Pl>>=1; / /shift to next column bit
        a+=4;
        } / /end j-loop
else a+=32;
Pg>>1; / /shift to next line
if(Pg==0)goto Beg; / /current RGBA group has completed
goto Nach;
Fin:
return M;}
```

What is claimed is:

1. A computer-implemented method of compressing a block of graphics image data into a compressed block, the block having a plurality of lines, each line having a plurality of columns, each column including a pixel, each pixel having a color represented by red, green, blue, and intensity values, the computer-implemented method comprising the steps of:

(A) building an array of color ordinal numbers by identifying all colors present in the pixels of the block, each color ordinal number representing one of the colors, the array of color ordinal numbers comprising one of the color ordinal numbers corresponding to the color of a pixel for each pixel in the block;

(B) storing the red, green, blue, and intensity values for a selected one of the colors in the compressed block;

(C) building a first set of flags indicating lines in the block having pixels of the selected color according to the array of color ordinal numbers;

(D) storing the first set of flags in the compressed block;

(E) building at least one second set of flags indicating columns having pixels of the selected color within lines in the block having pixels of the selected color according to the array of color ordinal numbers, each line having pixels of the selected color being represented by one of the second set of flags;

(F) storing the at least one second set of flags in the compressed block; and (G) repeating steps (B) through (F) for all colors in the block.

2. The computer-implemented method of claim 1, further comprising the step of:

storing a size of the compressed block in the compressed block.

3. In a computer system, an apparatus for compressing a block of graphics image data into a compressed block, the block having a plurality of lines, each line having a plurality of columns, each column including a pixel, each pixel having a color represented by red, green, blue, and intensity values, the apparatus comprising:

means for building an array of color ordinal numbers by identifying all colors present in the pixels of the block, each color ordinal number representing one of the colors, the array of color ordinal numbers comprising one of the color ordinal numbers corresponding to the color of a pixel for each pixel in the block;

means for building a first set of flags indicating lines in the block having pixels of a selected color according to the array of color ordinal numbers;

means for building at least one second set of flags indicating columns having pixels of the selected color within lines in the block having pixels of the selected color according to the array of color ordinal numbers, each line having pixels of the selected color being represented by one of the second set of flags;

means for storing the red, green, blue, and intensity values, the first set of flags, and the at least one second set of flags for a selected one of the colors in the compressed block.

4. A computer-implemented method of compressing graphics image data into at least one compressed block comprising the steps of:

(A) reading at least one block of graphics image data, the block having a plurality of lines, each line having a plurality of columns, each column including a pixel, each pixel having a color represented by red, green, blue, and intensity values;

(B) building an array of color ordinal numbers by identifying all distinct colors present in the pixels of the block, each color ordinal number representing one of the distinct colors, the array of color ordinal numbers comprising one of the color ordinal numbers corresponding to the distinct color of a pixel for each pixel in the block;

(C) selecting a current color of the distinct colors present in the block;

(D) storing the red, green, blue, and intensity values for the current color in the compressed block;

(E) building a set of group flags indicating lines in the block having pixels of the current color according to the array of color ordinal numbers;

(F) storing the set of group flags in the compressed block;

(G) building at least one set of line flags indicating columns having pixels of the current color within lines in the block having pixels of the current color according to the array of color ordinal numbers, each line having pixels of the current color being represented by one set of line flags; and (H) storing the at least one set of line flags in the compressed block.

5. The computer-implemented method of claim 4, further comprising the step of:

repeating steps (C) through (H) for all distinct colors in the block.

6. The computer-implemented method of claim 5, further comprising the step of:

repeating steps (A) through (H) for all blocks of the graphics image data.

7. The computer-implemented method of claim 4, further comprising the step of:

storing a size of the compressed block in the compressed block.

8. The computer-implemented method of claim 4, wherein the block comprises eight lines of eight columns per line.

9. A computer-implemented method of compressing graphics image data into at least one compressed block comprising the steps of:

(A) obtaining a mask value;

(B) reading at least one block of graphics image data, the block having a plurality of lines, each line having a plurality of columns, each column including a pixel, each pixel having a color represented by red, green, blue, and intensity values;

(C) building an array of color ordinal numbers by identifying all distinct colors present in the pixels of the block according to the mask value, each color ordinal number representing one of the distinct colors, the array of color ordinal numbers comprising one of the color ordinal numbers corresponding to the distinct color of a pixel for each pixel in the block;

(D) selecting a current color of the distinct colors present in the block;

(E) storing the red, green, blue, and intensity values for the current color in the compressed block;

(F) building a set of group flags indicating lines in the block having pixels of the current color according to the array of color ordinal numbers;

(G) storing the set of group flags in the compressed block;

(H) building at least one set of line flags indicating columns having pixels of the current color within lines in the block having pixels of the current color according to the array of color ordinal numbers, each line having pixels of the current color being represented by one set of line flags; and (I) storing the at least one set of line flags in the compressed block.

10. The computer-implemented method of claim 9, further comprising the step of:

repeating steps (D) through (I) for all distinct colors in the block.

11. The computer-implemented method of claim 9, further comprising the step of:

repeating steps (B) through (I) for all blocks of the graphics image data.

12. The computer-implemented method of claim 9, further comprising the step of:

storing a size of the compressed block and the mask value in the compressed block.

13. The computer-implemented method of claim 9, wherein the block comprises eight lines of eight columns per line.

14. The computer-implemented method of claim 9, wherein two colors, a first color having a first red value, a first green value, a first blue value, and a first intensity value, and a second color having a second red value, a second green value, a second blue value, and a second intensity value, are distinct if the first red value modulo the mask value is rot equal to the second red value divided by the mask value, the first green value divided by the mask value is not equal to the second green value modulo the mask value, the first blue value divided by the mask value is not equal to the second blue value divided by the mask value, and the first intensity value divided by the mask value is not equal to the second intensity value divided by the mask value.

15. The computer-implemented method of claim 9, wherein the red, green, blue, and intensity values are masked according to the mask value and stored in two bytes of storage in the compressed block.

16. The computer-implemented method of claim 9, further comprising the step of:

moving the red, green, blue, and intensity values of a distinct color occurring most frequently in pixels of the block to the end of the compressed block.

17. The computer-implemented method of claim 9, further comprising the step of:

sequentially outputting each compressed block to a file in a computer system.

18. In a computer system, an apparatus for compressing a block of graphics image data into at least one compressed block, the block having a plurality of lines, each line having a plurality of columns, each column including a pixel, each pixel having a color represented by red, green, blue, and intensity values, the apparatus comprising:

means for obtaining a mask value;

means for reading at least one block of graphics image data;

means for building an array of color ordinal numbers by identifying all distinct colors present in the pixels of the block according to the mask value, each color ordinal number representing one of the distinct colors, the array of color ordinal numbers comprising one of the color ordinal numbers corresponding to the distinct color of a pixel for each pixel in the block;

means for selecting a current color of the distinct colors present in the block;

means for building a set of group flags indicating lines in the block having pixels of the current color according to the array of color ordinal numbers;

means for building at least one set of line flags indicating columns having pixels of the current color within lines in the block having pixels of the current color according to the array of color ordinal numbers, each line having pixels of the current color being represented by one set of line flags; and means for storing the number of distinct colors, the mask value, the red, green, blue, and intensity values, the set of group flags, and the at least one set of line flags for the current color in the compressed block.

19. A computer-implemented method of compressing graphics image data into at least one compressed block comprising the steps of:

(A) obtaining a mask value;

(B) reading a block of graphics image data, the block having a plurality of lines, each line having a plurality of columns, each column including a pixel, each pixel having a color represented by red, green, blue, and intensity values;

(C) building an array of color ordinal numbers by identifying all distinct colors present in the pixels of the block according to the mask value, each color ordinal number representing one of the distinct colors, the array of color ordinal numbers comprising one of the color ordinal numbers corresponding to the distinct color of a pixel for each pixel in the block;

(D) selecting a current color of the distinct colors present in the block;

(E) storing the red, green, blue, and intensity values for the current color in the compressed block;

(F) building a set of group flags indicating lines in the block having pixels of the current color according to the array of color ordinal numbers;

(G) storing the set of group flags in the compressed block;

(H) building at least one set of line flags indicating columns having pixels of the current color within lines in the block having pixels of the current color according to the array of color ordinal numbers, each line having pixels of the current color being represented by one set of line flags;

(I) storing the at least one set of line flags in the compressed block;

(J) repeating steps (D) through (I) for all distinct colors in the block;

(K) moving the red, green, blue, and intensity values of a distinct color occurring most frequently in pixels of the block to the end of the compressed block;

(L) storing a size of the compressed block and the mask value in the compressed block; and (M) repeating steps (B) through (L) for all blocks of graphics image data.

20. A computer-implemented method of decompressing a compressed block of graphics image data into an uncompressed block, the uncompressed block having a plurality of lines, each line having a plurality of columns, each column including a pixel, each pixel having a color represented by red, green, blue, and intensity values, the compressed block having a plurality of distinct red, green, blue, and intensity values color combinations, each distinct color combination having a set of group flags representing the presence of the distinct color combination in lines of the uncompressed block and at least one set of line flags representing the presence of the distinct color combination in columns of the uncompressed block for lines of the uncompressed block having the distinct color combination, the computer-implemented method comprising the steps of:

(A) getting the red, green, blue, and intensity values for a selected color from the compressed block;

(B) getting the set of group flags for the selected color from the compressed block;

(C) getting a set of line flags corresponding to a selected group flag in the set of group flags indicating the presence of the selected color in at least one line of the compressed block;

(D) writing the red, green, blue, and intensity values into the uncompressed block at selected locations indexed by columns having the selected color as indicated by the set of line flags for the line having the selected color as indicated by the selected group flag;

(E) repeating steps (C) and (D) for each group flag in the set of group flags indicating the presence of the selected color in at least one line of the compressed block; and (F) repeating steps (A)–(E) for all distinct color combinations of the compressed block.

21. In a computer system, an apparatus for decompressing a compressed block of graphics image data into an uncompressed block, the uncompressed block having a plurality of lines, each line having a plurality of columns, each column including a pixel, each pixel having a color represented by red, green, blue, and intensity values, the compressed block having a plurality of distinct red, green, blue, and intensity values color combinations, each distinct color combination having a set of group flags representing the presence of the distinct color combination in lines of the uncompressed block and at least one set of line flags representing the presence of the distinct color combination in columns of the uncompressed block for lines of the uncompressed block having the distinct color combination, the apparatus comprising:

means for reading the red, green, blue, and intensity values for a selected color from the compressed block, the set of group flags for the selected color from the compressed block, and at least one set of line flags corresponding to a group flag in the set of group flags indicating the presence of the selected color in at least one line of the compressed block; and means for writing the red, green, blue, and intensity values into the uncompressed block at selected locations indexed by columns having the selected color as indicated by the at least one set of line flags and by lines having the selected color as indicated by the set of group flags.

22. A computer-implemented method of decompressing a compressed graphics image data into at least one uncompressed block, the uncompressed block having a plurality of lines, each line having a plurality of columns, each column including a pixel, each pixel having a color represented by red, green, blue, and intensity values, the computer-implemented method comprising the steps of:

(A) reading a block of compressed graphics image data, the compressed block having a plurality of distinct red, green, blue, and intensity values color combinations, each distinct color combination having a set of group flags representing the presence of the distinct color combination in lines of the uncompressed block and at least one set of line flags representing the presence of the distinct color combination in columns of the uncompressed block for lines of the uncompressed block having the distinct color combination;

(B) getting the red, green, blue, and intensity values for a selected color from the compressed block;

(C) getting the set of group flags for the selected color from the compressed block;

(D) getting a set of line flags corresponding to a selected group flag in the set of group flags indicating the presence of the selected color in at least one line of the compressed block;

(E) writing the red, green, blue, and intensity values into the uncompressed block at selected locations indexed by columns having the selected color as indicated by the set of line flags for the line having the selected color as indicated by the selected group flag;

(F) repeating steps (D) and (E) for each group flag in the set of group flags indicating the presence of the selected color in at least one line of the compressed block;

(G) repeating steps (B)–(F) for all distinct color combinations of the compressed block; and (H) repeating steps (A)–(G) for all blocks of the compressed graphics image data.

23. The computer-implemented method of claim 22, further comprising the steps of:

(A1) getting the red, green, blue, and intensity values for a last color from the compressed block;

(A2) writing the red, green, blue, and intensity values for the last color into the uncompressed block for all pixels of the uncompressed block.

24. A computer-implemented method of decompressing a compressed graphics image data into at least one uncompressed block, the uncompressed block having a plurality of lines, each line having a plurality of columns, each column including a pixel, each pixel having a color represented by red, green, blue, and intensity values, the computer-implemented method comprising the steps of:

(A) reading a block of compressed graphics image data, the compressed block having a mask value, a plurality of distinct red, green, blue, and intensity values color combinations, each distinct color combination having a set of group flags representing the presence of the distinct color combination in lines of the uncompressed block and at least one set of line flags representing the presence of the distinct color combination in columns of the uncompressed block for lines of the uncompressed block having the distinct color combination;

(B) getting the mask value from the compressed block;

(C) getting the red, green, blue, and intensity values for a last color from the compressed block and modifying the red, green, blue, and intensity values according to the mask value;

(D) writing the modified red, green, blue, and intensity values for the last color into the uncompressed block for all pixels of the uncompressed block;

(E) getting the red, green, blue, and intensity values for a selected color from the compressed block and modifying the red, green, blue, and intensity values according to the mask value;

(F) getting the set of group flags for the selected color from the compressed block;

(G) getting a set of line flags corresponding to a selected group flag in the set of group flags indicating the presence of the selected color in at least one line of the compressed block;

(H) writing the modified red, green, blue, and intensity values of the selected color into the uncompressed block at selected locations indexed by columns having the selected color as indicated by the set of line flags and for the line having the selected color as indicated by the selected group flag;

(I) repeating steps (G) and (H) for each group flag in the set of group flags indicating the presence of the selected color in at least one line of the compressed block;

(J) repeating steps (E)–(I) for all distinct color combinations of the compressed block; and (K) repeating steps (A)–(J) for all blocks of the compressed graphics image data.

25. The computer-implemented method of claim 24, wherein two colors, a first color having a first red value, a first green value, a first blue value, and a first intensity value, and a second color having a second red value, a second green value, a second blue value, and a second intensity value, are distinct if the first red value divided by the mask value is not equal to the second red value divided by the mask value, the first green value divided by the mask value is not equal to the second green value divided by the mask value, the first blue value divided by the mask value is not equal to the second blue value divided by the mask value, and the first intensity value divided by the mask value is not equal to the second intensity value divided by the mask value.

26. In a computer system, an apparatus for decompressing a compressed block of graphics image data into an uncompressed block, the uncompressed block having a plurality of lines, each line having a plurality of columns, each column including a pixel, each pixel having a color represented by red, green, blue, and intensity values, the compressed block having a plurality of distinct red, green, blue, and intensity values color combinations, each distinct color combination having a set of group flags representing the presence of the distinct color combination in lines of the uncompressed block and at least one set of line flags representing the presence of the distinct color combination in columns of the uncompressed block for lines of the uncompressed block having the distinct color combination, the apparatus comprising:

means for reading a mask value from the compressed block and the red, green, blue, and intensity values for a last color from the compressed block;

means for modifying red, green, blue, and intensity values according to the mask value;

means for writing the modified red, green, blue, and intensity values for the last color into the uncompressed block for all pixels of the uncompressed block;

means for reading the red, green, blue, and intensity values for a selected color from the compressed block, the set of group flags for the selected color from the compressed block, and at least one set of line flags corresponding to a group flag in the set of group flags indicating the presence of the selected color in at least one line of the compressed block; and means for writing the modified red, green, blue, and intensity values for the selected color into the uncompressed block at selected locations indexed by columns having the selected color as indicated by the set of line flags and by lines having the selected color as indicated by the set of group flags.

27. A computer-readable medium comprising:

a program code embodied in the computer readable medium for compressing a block of graphics image data into a compressed block, the block having a plurality of lines, each line having a plurality of columns, each column including a pixel, each pixel having a color represented by red, green, blue, and intensity values, the computer-readable program segment comprising instructions for performing the steps of:

(A) building an array of color ordinal numbers by identifying all colors present in the pixels of the block, each color ordinal number representing one of the colors, the array of color ordinal numbers comprising one of the color ordinal numbers corresponding to the color of a pixel for each pixel in the block;

(B) storing the red, green, blue, and intensity values for a selected one of the colors in the compressed block;

(C) building a first set of flags indicating lines in the block having pixels of the selected color according to the array of color ordinal numbers;

(D) storing the first set of flags in the compressed block;

(E) building at least one second set of flags indicating columns having pixels of the selected color within lines in the block having pixels of the selected color according to the array of color ordinal numbers, each line having pixels of the selected color being represented by one of the second set of flags;

(F) storing the at least one second set of flags in the compressed block; and (G) repeating steps (B) through (F) for all colors in the block.

28. A computer-readable medium comprising:

a program code embodied in the computer readable medium for decompressing a compressed block of graphics image data into an uncompressed block, the uncompressed block having a plurality of lines, each line having a plurality of columns, each column including a pixel, each pixel having a color represented by red, green, blue, and intensity values, the compressed block having a plurality of distinct red, green, blue, and intensity values color combinations, each distinct color combination having a set of group flags representing the presence of the distinct color combination in lines of the uncompressed block and at least one set of line flags representing the presence of the distinct color combination in columns of the uncompressed block for lines of the uncompressed block having the distinct color combination, the computer-readable program segment comprising instructions for performing the steps of:

(A) getting the red, green, blue, and intensity values for a selected color from the compressed block;

(B) getting the set of group flags for the selected color from the compressed block;

(C) getting a set of line flags corresponding to a selected group flag in the set of group flags indicating the presence of the selected color in at least one line of the compressed block;

(D) writing the red, green, blue, and intensity values into the uncompressed block at selected locations indexed by columns having the selected color as indicated by the set of line flags for the line having the selected color as indicated by the selected group flag;

(E) repeating steps (C) and (D) for each group flag in the set of group flags indicating the presence of the selected color in at least one line of the compressed block; and (F) repeating steps (A)–(E) for all distinct color combinations of the compressed block.

29. An article of manufacture, comprising:

a computer-readable medium bearing a program code embodied therein for compressing graphics image data including a first computer-readable program segment for compressing a block of graphics image data into a compressed block, the block having a plurality of lines, each line having a plurality of columns, each column including a pixel, each pixel having a color represented by red, green, blue, and intensity values, the first computer-readable program segment comprising instructions for performing the steps of:

(A) building an array of color ordinal numbers by identifying all colors present in the pixels of the block, each color ordinal number representing one of the colors, the array of color ordinal numbers comprising one of the color ordinal numbers corresponding to the color of a pixel for each pixel in the block;

(B) storing the red, green, blue, and intensity values for a selected one of the colors in the compressed block;

(C) building a first set of flags indicating lines in the block having pixels of the selected color according to the array of color ordinal numbers;

(D) storing the first set of flags in the compressed block;

(E) building at least one second set of flags indicating columns having pixels of the selected color within lines in the block having pixels of the selected color according to the array of color ordinal numbers, each line having pixels of the selected color being represented by one of the second set of flags;

(F) storing the at least one second set of flags in the compressed block; and (G) repeating steps (A) through (F) for all colors in the block.

30. An article of manufacture, comprising:

a computer-readable medium bearing a program code embodied therein for decompressing a compressed graphics image data including a first computer-readable program segment for decompressing a compressed block of graphics image data into an uncompressed block, the uncompressed block having a plurality of lines, each line having a plurality of columns, each column including a pixel, each pixel having a color represented by red, green, blue, and intensity values, the compressed block having a plurality of distinct red, green, blue, and intensity values color combinations, each distinct color combination having a set of group flags representing the presence of the distinct color combination in lines of the uncompressed block and at least one set of line flags representing the presence of the distinct color combination in columns of the uncompressed block for lines of the uncompressed block having the distinct color combination, the first computer-readable program segment comprising instructions for performing the steps of:

(A) getting the red, green, blue, and intensity values for a selected color from the compressed block;

(B) getting the set of group flags for the selected color from the compressed block;

(C) getting a set of line flags corresponding to a selected group flag in the set of group flags indicating the presence of the selected color in at least one line of the compressed block;

(D) writing the red, green, blue, and intensity values into the uncompressed block at selected locations indexed by columns having the selected color as indicated by the set of line flags and for the line having the selected color as indicated by the selected group flag;

(E) repeating steps (C) and (D) for each group flag in the set of group flags indicating the presence of the selected color in at least one line of the compressed block; and (F) repeating steps (A)–(E) for all distinct color combinations of the compressed block.

31. A memory storing data for representing a compressed block of graphics image data based on an uncompressed block of graphics image data, the uncompressed block having a plurality of lines, each line having a plurality of columns, each column including a pixel, each pixel having a color represented by red, green, blue, and intensity values, the memory comprising:
  a data structure stored in said memory and comprising:
    a plurality of distinct color combinations having red, green, blue, and intensity values, a set of group flags representing the presence of each distinct color combination in lines of the uncompressed block for each distinct color combination and at least one set of line flags representing the presence of each distinct color combination in columns of the uncompressed block for each line of the uncompressed block having each distinct color combination; and
  a mask value for the compressed block wherein two colors, a first color having a first red value, a first green value, a first blue value, and a first intensity value, and a second color having a second red value, a second green value, a second blue value, and a second intensity value, are distinct if the first red value divided by the mask value is not equal to the second red value divided by the mask value, the first green value divided by the mask value, the first blue value divided by the mask value is not equal to the second blue value divided by the mask value, and the first intensity value divided by the mask value is not equal to the second intensity value divided by the mask value.

* * * * *